(12) United States Patent
Zhao et al.

(10) Patent No.: US 10,750,463 B2
(45) Date of Patent: Aug. 18, 2020

(54) METHOD AND DEVICE FOR IDENTIFYING SYNCHRONIZATION PRIORITY

(71) Applicant: CHINA ACADEMY OF TELECOMMUNICATIONS TECHNOLOGY, Beijing (CN)

(72) Inventors: Li Zhao, Beijing (CN); Yuanyuan Li, Beijing (CN); Haijun Zhou, Beijing (CN); Rui Zhao, Beijing (CN); Ying Peng, Beijing (CN); Jiayi Fang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 25 days.

(21) Appl. No.: 16/090,177

(22) PCT Filed: Mar. 31, 2017

(86) PCT No.: PCT/CN2017/078922
§ 371 (c)(1),
(2) Date: Sep. 28, 2018

(87) PCT Pub. No.: WO2017/167254
PCT Pub. Date: Oct. 5, 2017

(65) Prior Publication Data
US 2019/0116569 A1    Apr. 18, 2019

(30) Foreign Application Priority Data
Mar. 31, 2016 (CN) .......................... 2016 1 0197109

(51) Int. Cl.
*H04W 56/00*  (2009.01)
*H04W 4/70*   (2018.01)
(Continued)

(52) U.S. Cl.
CPC ......... *H04W 56/0025* (2013.01); *G01S 19/11* (2013.01); *G01S 19/23* (2013.01);
(Continued)

(58) Field of Classification Search
CPC ... H04W 56/0025; H04W 56/00; H04W 4/70; H04W 56/0015; H04W 56/001; G01S 19/11; G01S 19/23
See application file for complete search history.

(56) References Cited

U.S. PATENT DOCUMENTS 8,374,163 B2    2/2013  Horn et al.
2012/0134455 A1 5/2012  Wang et al.
(Continued)

FOREIGN PATENT DOCUMENTS

CN    1507227 A    6/2004
CN    1956431 A    5/2007
(Continued)

OTHER PUBLICATIONS

International Search Report for PCT/CN2017/078922 dated Jun. 15, 2017 and its English translation provided by WIPO.
(Continued)

*Primary Examiner* — Thai Nguyen
(74) *Attorney, Agent, or Firm* — Ladas & Parry, LLP

(57) ABSTRACT

Embodiments of the present disclosure provide a method and a device for identifying a synchronization priority, including: determining a synchronization priority of a node according a connection relationship between the node and a Global Navigation Satellite System (GNSS) and a relative relationship between the node and a coverage scope of an eNB; configuring a synchronization sequence and an in coverage flag of the node according to the synchronization priority of the node. Combination of the synchronization
(Continued)

sequence and the in coverage flag of the node is used to identify the synchronization priority of the node.

15 Claims, 5 Drawing Sheets

(51) Int. Cl.
  *G01S 19/11* (2010.01)
  *G01S 19/23* (2010.01)
(52) U.S. Cl.
  CPC .............. *H04W 4/70* (2018.02); *H04W 56/00* (2013.01); *H04W 56/0015* (2013.01)

(56) References Cited

U.S. PATENT DOCUMENTS

| | | |
|---|---|---|
| 2013/0010658 A1 | 1/2013 | Zhu |
| 2013/0077512 A1 | 3/2013 | Chang et al. |
| 2015/0117375 A1 | 4/2015 | Sartori et al. |
| 2015/0264588 A1 | 9/2015 | Li et al. |
| 2016/0037466 A1 | 2/2016 | Yang et al. |
| 2016/0374038 A1 | 12/2016 | Wang |
| 2017/0013578 A1 | 1/2017 | Wei et al. |
| 2018/0213498 A1* | 7/2018 | Khoryaev ......... H04W 56/0015 |

FOREIGN PATENT DOCUMENTS

| | | |
|---|---|---|
| CN | 101123465 A | 2/2008 |
| CN | 101938824 A | 1/2011 |
| CN | 103347246 A | 10/2013 |
| CN | 103828398 A | 5/2014 |
| CN | 104796368 A | 7/2015 |
| CN | 104811925 A | 7/2015 |
| WO | 2012048729 A1 | 4/2012 |
| WO | 2014182342 A1 | 11/2014 |
| WO | 2015057156 A2 | 4/2015 |
| WO | 2015114418 A1 | 8/2015 |

OTHER PUBLICATIONS

Written Opinion of the International Search Authority PCT/CN2017/078922 dated Jun. 15, 2017 and its English translation provided by Google Translate.
The First Office Action dated Aug. 17, 2017 in CN application 201410023553.9 (CN 104796368 A) with translation from Global Dossier.
ETRI. (Nov. 11-15, 2013) 3GPP TSG-RAN1 Meeting #75 on the D2DSS and PD2DSCH. San Francisco. USA.
First Office Action and Search Report from CN app. No. 201610197109.8, dated Dec. 26, 2018, with English translation from Global Dossier.
Extended European Search Report from EP app. No. 17773284.9, dated Feb. 21, 2019.
Written Opinion of the International Searching Authority from PCT/CN2017/078922, dated Jun. 15, 2016, with English translation from WIPO.
International Preliminary Report on Patentability from PCT/CN2017/078922, dated Oct. 2, 2018, with English translation from WIPO.
"Discussion on synchronization issues", 3GPP TSG RAN WG1 Meeting #84, St. Julian's, Malta, Feb. 15-19, 2016.
Notice of Reasons for Refusal from JP app. No. 2018-551336, dated Sep. 3, 2019, with English translation from Global Dossier.
"Synchronization procedure and synchronization source priority for V2V", R1-160306, 3GPP TSG RAN WG1 Meeting #84, St. Julian's, Malta, Feb. 15-19, 2016.
"Enhancement to sidelink synchronization", R1-160684, 3GPP TSG RAN WG1 Meeting #83, St. Julian's, Malta, Feb. 15-19, 2016.
"SLSS Enhancements for GNSS based Synchronization", R1-161052, 3GPP TSG RAN WG1 Meeting #84, St. Julian's, Malta, Feb. 15-19, 2016.
Notification of Reason for Refusal from KR app. No. 10-2018-7029849, dated Nov. 29, 2019, with English translation provided by KIPO.

* cited by examiner

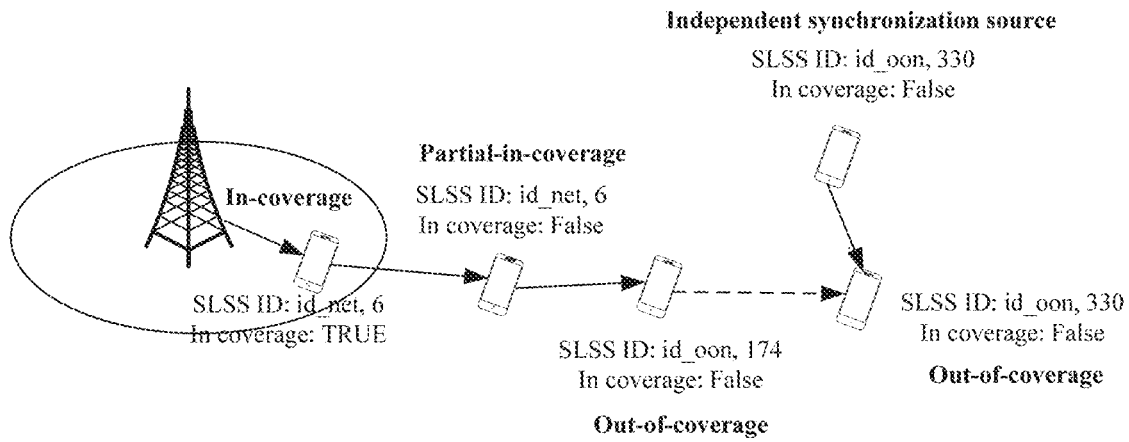

Fig. 1 a synchronization priority of a node is determined according a connection relationship between the node and a GNSS and a relative relationship between the node and a coverage scope of an eNB    11 a synchronization sequence and an in coverage flag of the node is configured according to the synchronization priority of the node. Combination of the synchronization sequence and in coverage flag of the node is used to identify the synchronization priority of the node    12

Fig. 2

METHOD AND DEVICE FOR IDENTIFYING SYNCHRONIZATION PRIORITY

CROSS-REFERENCE TO RELATED APPLICATIONS

This application is the U.S. national phase of PCT Application No. PCT/CN2017/078922 filed on Mar. 31, 2017, which claims the benefit and priority of Chinese Application No. 201610197109.8, filed on Mar. 31, 2016. The entire disclosures of the applications are incorporated herein by reference.

TECHNICAL FIELD

The present disclosure relates to a communication technology filed, and more particularly to a method and device for identifying a synchronization priority.

BACKGROUND

The Vehicle Infrastructure Cooperative System (VICS) may implement vehicle-vehicle information interaction and sharing and vehicle-road information interaction and sharing based on technologies, such as wireless communication, and also may implement intelligent cooperation between the vehicle and infrastructure. Therefore, the target of optimizing and utilizing system resources, enhancing road traffic safety, and alleviating traffic congestion may be achieved.

At present, during the research of the 3rd Generation Partnership Project (3GPP) standard, three synchronization priorities are configured in the Long Term Evolution (LTE) Device to Device (D2D) communication standard. The three synchronization priorities are: in-coverage User Equipment (UE)>partial-in-coverage UE>out-of-coverage UE, which are organized from high to low in order of priority. For instance, as shown in FIG. 1, the standard defines that the synchronization priority may be distinguished by one bit of in coverage flag bit combination, which is transmitted via a Side Link Synchronization Signal (SLSS) synchronization sequence and Physical Side Link Broadcast Channel (PSBCH).

The specific processing includes:

the in-coverage UE: the synchronization sequence is in the id_net set, and is in a range of [0, 167]. The in coverage flag of the synchronization sequence is True;

the partial-in-coverage UE: the partial-in-coverage UE is in synchronization with the in-coverage UE. The synchronization sequence transmitted by the partial-in-coverage UE is the same as the synchronization sequence of a synchronization reference UE (in-coverage UE) selected by the partial-in-coverage UE, however, the in coverage flag of the partial-in-coverage UE is False;

The out-of-coverage UE are divided into three kinds of situations:

1) the selected synchronization reference UE is the partial-in-coverage UE, the number of the transmitted synchronization sequence is the number of the synchronization sequence of the reference UE (in-coverage UE)+168, the synchronization sequence is in the id_oon set, the value of the synchronization sequence is in the range of [168, 335] and the in coverage flag of the synchronization reference UE is False;

2) the selected synchronization reference UE is the out-of-coverage UE, the transmitted synchronization sequence is the same as the synchronization sequence of the selected reference UE (out-of-coverage UE), the synchronization sequence is in the id_oon set, the value of the synchronization sequence is in the range of [168, 335] and the in coverage flag of the synchronization reference UE is False;

3) this kind of UE does not select any synchronization reference UE and forms an independent synchronization source, the synchronization sequence is in the id_oon set, the UE randomly selects a sequence from [168, 335], configures the selected sequence as its synchronization sequence and transmits the synchronization sequence, the in coverage flag of this kind of UE is False.

There may be two kinds of synchronization sources in the Internet of vehicle communication. Such as, the synchronization source may be a node of the Global Navigation Satellite System (GNSS) or may be the eNB.

In the LTE D2D communication, in the Centralized synchronous network, the central node of which is the eNB, the in-coverage UE may forward the synchronization obtained from the eNB, so that the UE, which is out of the coverage of the eNB, may obtain the synchronization of the in-coverage UE. In the scenario of the partial coverage, the UE, which is at the edge of the network coverage, also can receive the D2D Synchronization Signal (D2DSS) from the in-coverage UE, the out-of-coverage UE may receive the D2D signal from the in-coverage UE based on the D2DSS. As for the out-of-coverage UE, which is far from the eNB, an ISS-based synchronization network may be formed. In the LTE D2D, the node, which directly obtains the GNSS, is not taken as the synchronization source. The synchronization scheme only takes the eNB as the core and sends out the clock of the eNB.

In the Internet of vehicle communication, compared with the mobile phone, the vehicle node has more processing power. The vehicle node may directly obtain reliable synchronization signals, may be directly configured as the synchronization source, may expedite the synchronization convergence, improve synchronization accuracy, form a uniform timing and reduce number of synchronization clusters.

Therefore, the design of the synchronization information transmission scheme of the Vehicle Network should be modified to support the synchronization communication in the Vehicle Network. In the VICS, compared with the synchronization system, which is formed taking the eNB as the center by the LTE D2D, due to the introduction of the GNSS, multiple synchronization sources may provide the synchronization information, the synchronization convergence may be expedited and the number of the synchronization clusters may be reduced. However, till then, a reasonable synchronization information transmission method, with which the UE may determine the synchronization priority and perform synchronization adjustment, has not been formed.

SUMMARY

An objective of the present disclosure is to provide a method and device for identifying a synchronization priority, to solve a problem of slow synchronization convergence, too many synchronization clusters and low synchronization accuracy, resulting from that only the eNB is taken as the synchronization source.

In order to achieve the above objective, an embodiment of the present disclosure provides a method for identifying a synchronization priority, including: determining a synchronization priority of a node according a connection relationship between the node and a Global Navigation Satellite System (GNSS) and a relative relationship between the node and a coverage scope of an eNB: and configuring a synchronization sequence and an in coverage flag of the node according to the synchronization priority of the node; wherein combination of the synchronization sequence and the in coverage flag of the node is used to identify the synchronization priority of the node.

The relative relationship between the node and the coverage scope of the eNB includes: a first relative relationship, a second relative relationship and a third relative relationship; the first relative relationship includes that the node is in the coverage of the eNB; the second relative relationship includes that the node is out of the coverage of the eNB, but the node is able to receive synchronization information from a node that is in the coverage of the eNB and synchronizes with the node that is in the coverage of the eNB; the third relative relationship includes that the node is out of the coverage of the eNB, but the node is not able to receive the synchronization information from the node that is in the coverage of the eNB.

Before determining the synchronization priority of the node according the connection relationship between the node and GNSS and the relative relationship between the node and the coverage scope of the eNB, the method further includes: determining a synchronization method adopted by the node, wherein the synchronization method includes: GNSS-based synchronization and eNB-based synchronization. When the synchronization method is the GNSS-based synchronization, determining the synchronization priority of the node according the connection relationship between the node and the GNSS and the relative relationship between the node and the coverage scope of the eNB includes: when the node is in the coverage of the eNB and the node is able to directly obtain information of the GNSS, determining the synchronization priority of the node as a first priority; when the node is out of the coverage of the eNB and the node is able to directly obtain the information of the GNSS, determining the synchronization priority of the node as a second priority; when the node is not able to directly obtain the information of the GNSS, but the node is able to obtain the information of the GNSS via another node, determining the synchronization priority of the node as a third priority; otherwise, determining the synchronization priority of the node as a fourth priority.

The method for determining the synchronization priority of the node as a fourth priority includes: when the node is not able to obtain the information of the GNSS, but the node is able to obtain the information of the GNSS via sequential forwarding of multiple other nodes, determining the synchronization priority of the node as the fourth priority: when the node is out of the coverage of the eNB and the node uses an independent synchronization source, determining the synchronization priority of the node as the fourth priority. When the synchronization method is the eNB-based synchronization, determining the synchronization priority of the node according the connection relationship between the node and GNSS and the relative relationship between the node and the coverage scope of the eNB includes: when the node is in the coverage of the eNB and the node synchronizes with the eNB, determining the synchronization priority of the node as a first priority; when the node is out of the coverage of the eNB and the node is able to directly obtain the information of the GNSS, determining the synchronization priority of the node as a second priority; when the node is out of the coverage of the eNB and is not able to directly obtain the information of the GNSS, but the node is able to obtain the information of the GNSS via another node, determining the synchronization priority of the node as a third priority; otherwise, determining the synchronization priority of the node as a fourth priority.

The method for determining the synchronization priority of the node as the fourth priority includes: when the node is out of the coverage of the eNB and is not able to directly obtain the information of the GNSS, but the node is able to obtain the information of the GNSS via sequential forwarding of multiple other nodes, determining the synchronization priority of the node as the fourth priority; when the node is out of the coverage of the eNB and the node is able to receive synchronization information sent from a node that is in the coverage of the eNB, determining the synchronization priority of the node as the fourth priority; when the node is out of the coverage of the eNB and the node uses an independent synchronization source, determining the synchronization priority of the node as the fourth priority.

The method for configuring the synchronization sequence and in coverage flag of the node according to the synchronization priority of the node includes: when the synchronization priority of the node is the first priority and the synchronization method of the node is the GNSS-based synchronization, determining the synchronization sequence of the node as a first synchronization sequence and an identifier of the first synchronization sequence is a first fixed value and determining the in coverage flag of the node as a first flag; when the synchronization method of the node is the eNB-based synchronization, determining the synchronization sequence of the node as the first synchronization sequence and the identifier of the first synchronization sequence as a third fixed value and determining the in coverage flag of the node as the first flag; when the synchronization priority of the node is the second priority, determining the synchronization sequence of the node as the first synchronization sequence, determining the identifier of the first synchronization sequence as the first fixed value and determining the in coverage flag of the node as a second flag; when the synchronization priority of the node is the third priority, determining the synchronization sequence of the node as the first synchronization sequence, determining the identifier of the first synchronization sequence as the second fixed value and determining the in coverage flag of the node as the second flag; when the synchronization sequence of the node is the fourth priority and a synchronization reference node selected by the node is the node of the third priority, determining the synchronization sequence of the node as a second synchronization sequence, determining that an identifier of the second synchronization sequence is sum of the second fixed value and a preset value, determining the in coverage flag of the node as the second flag; when the synchronization reference node selected by the node is that of the fourth priority, determining the synchronization sequence of the node as the second synchronization sequence, determining that the identifier of the second synchronization sequence is the same as the identifier of the second synchronization sequence of the synchronization reference node, and determining the in coverage flag of the node as the second flag; when the node uses the independent synchronization source, determining the synchronization sequence of the node as the second synchronization sequence, determining the identifier of the second synchronization sequence as an arbitrary value of the second synchronization sequence and determining the in coverage flag of the node as the second flag.

The method for configuring the synchronization sequence and in coverage flag of the node according to the synchronization priority of the node includes: when the synchronization sequence of the node is the fourth priority, the node uses the eNB-based synchronization and the node is out of the coverage of the eNB, and the node is able to receive the synchronization information from a node that is in the coverage of the eNB and the synchronization node selected by the node is that of the first priority, determining the synchronization sequence of the node as the second synchronization sequence, determining the identifier of the second synchronization sequence as the sum of the identifier of the first synchronization sequence of the synchronization node and a preset value and determining the in coverage flag of the node as the second flag.

An embodiment of the present disclosure further provides a device for identifying a synchronization priority, including a processor, a transceiver and a storage. The processor is configured to read a program stored in the storage to: determine a synchronization priority of a node according a connection relationship between the node and a Global Navigation Satellite System (GNSS) and a relative relationship between the node and a coverage scope of an eNB; and configure a synchronization sequence and an in coverage flag of the node according to the synchronization priority of the node; wherein combination of the synchronization sequence and the in coverage flag of the node is used to identify the synchronization priority of the node.

The relative relationship between the node and the coverage scope of the eNB includes: a first relative relationship, a second relative relationship and a third relative relationship; the first relative relationship includes that the node is in the coverage of the eNB; the second relative relationship includes that the node is out of the coverage of the eNB, but the node is able to receive synchronization information from a node that is in the coverage of the eNB and synchronizes with the node that is in the coverage of the eNB; the third relative relationship includes that the node is out of the coverage of the eNB, but the node is not able to receive the synchronization information from the node that is in the coverage of the eNB.

The processor is further configured to determine a synchronization method adopted by the node, wherein the synchronization method includes: GNSS-based synchronization and eNB-based synchronization.

When the synchronization method is the GNSS-based synchronization, the processor is further configured to, determine the synchronization priority of the node as a first priority when the node is in the coverage of the eNB and the node is able to directly obtain information of the GNSS; determine the synchronization priority of the node as a second priority when the node is out of the coverage of the eNB and the node is able to directly obtain the information of the GNSS: determine the synchronization priority of the node as a third priority when the node is not able to directly obtain the information of the GNSS, but the node is able to obtain the information of the GNSS via another node: and determine the synchronization priority of the node as a fourth priority when the node does not satisfy the above conditions.

The processor is further configured to, determine the synchronization priority of the node as the fourth priority, when the node is not able to directly obtain the information of the GNSS, but the node is able to obtain the information of the GNSS via sequential forwarding of multiple other nodes; and determine the synchronization priority of the node as the fourth priority when the node is out of the coverage of the eNB and the node uses an independent synchronization source.

When the synchronization method is the eNB-based synchronization, the processor is further configured to, determine the synchronization priority of the node as a first priority when the node is in the coverage of the eNB and the node synchronizes with the eNB: determine the synchronization priority of the node as a second priority when the node is out of the coverage of the eNB and the node is able to directly obtain the information of the GNSS; determine the synchronization priority of the node as a third priority, when the node is out of the coverage of the eNB and is not able to directly obtain the information of the GNSS, but the node is able to obtain the information of the GNSS via another node; and determine the synchronization priority of the node as a fourth priority when the node does not satisfy the above conditions The processor is further configured to, determine the synchronization priority of the node as the fourth priority, when the node is out of the coverage of the eNB and is not able to directly obtain the information of the GNSS, but the node is able to indirectly obtain the information of the GNSS via sequential forwarding of multiple other nodes; determine the synchronization priority of the node as the fourth priority, when the node is out of the coverage of the eNB and the node is able to receive synchronization information sent from a node that is in the coverage of the eNB; determine the synchronization priority of the node as the fourth priority when the node is out of the coverage of the eNB and the node uses an independent synchronization source.

The processor is further configured to, determine the synchronization sequence of the node as a first synchronization sequence and an identifier of the first synchronization sequence as a first fixed value and to determine the in coverage flag of the node as a first flag, when the synchronization priority of the node is the first priority and the synchronization method of the node is the GNSS-based synchronization; determine the synchronization sequence of the node as the first synchronization sequence and the identifier of the first synchronization sequence is a third fixed value and determine the in coverage flag of the node as the first flag, when the synchronization method of the node is an eNB-based synchronization, determine the synchronization sequence of the node as the first synchronization sequence, determine the identifier of the first synchronization sequence as the first fixed value and determine the in coverage flag of the node as a second flag, when the synchronization priority of the node is the second priority; determine the synchronization sequence of the node as the first synchronization sequence, determine the identifier of the first synchronization sequence as a second fixed value and determine the in coverage flag of the node as a second flag, when the synchronization priority of the node is the third priority; determine the synchronization sequence of the node as a second synchronization sequence, determine that an identifier of the second synchronization sequence is sum of the second fixed value and a preset value, determine the in coverage flag of the node as the second flag, when the synchronization sequence of the node is the fourth priority, a synchronization reference node selected by the node is the node of the third priority; determine the synchronization sequence of the node as the second synchronization sequence, determine that the identifier of the second synchronization sequence is the same as the identifier of the second synchronization sequence of the synchronization reference node, and determine the in coverage flag of the node as the second flag, when the synchronization reference node selected by the node is that of the fourth priority; determine the synchronization sequence of the node as the second synchronization sequence, determine an identifier of the second synchronization sequence as an arbitrary value of the second synchronization sequence and determine the in coverage flag of the node as the second flag, when the node uses the independent synchronization source.

The processor is further configured to, determine the synchronization sequence of the node as the second synchronization sequence, determine the identifier of the second synchronization sequence as the sum of the identifier of the first synchronization sequence of the synchronization node and a preset value and determine the in coverage flag of the node as the second flag, when the synchronization sequence of the node is the fourth priority, the node uses the eNB-based synchronization and the node is out of the coverage of the eNB, and the node is able to receive the synchronization information from a node that is in the coverage of the eNB and the synchronization node selected by the node is that of the first priority.

The above technical scheme provided by embodiments of the present disclosure at least has following advancements.

In the method and device for identifying the synchronization priority provided by embodiments of the present disclosure, the synchronization priority of the node is determined according a connection relationship between the node in the vehicle infrastructure cooperative system and a Global Navigation Satellite System (GNSS) and a relative relationship between the node and a coverage scope of an eNB, different synchronization priorities may be identified via the combination of the synchronization sequence and the in coverage flag, so that the other nodes may distinguish different synchronization priorities. It may be supported that the node, which directly obtains the GNSS information, may be configured as the synchronization source and the eNB may also be configured as the synchronization source. The synchronization convergence may be expedited, the number of the synchronization clusters may be reduced and the accuracy of the synchronization may be improved.

BRIEF DESCRIPTION OF THE DRAWINGS

FIG. 1 is a schematic diagram illustrating synchronization priority and sequence thereof in the LTE D2D communication standard in the relevant prior art;

FIG. 2 is a flow chart illustrating basic steps of a method for identifying a synchronization priority in accordance with a first embodiment of the present disclosure;

DETAILED DESCRIPTION

To make the objectives, technical solutions, and advantages of the present disclosure clearer, the following further describes the embodiments of the present invention in detail with reference to the accompanying drawings.

First Embodiment

As shown in FIG. 2, the first embodiment provided by the present disclosure provides a method for identifying a synchronization priority, including:

Block 11: A synchronization priority of a node may be determined according a connection relationship between the node and a Global Navigation Satellite System (GNSS) and a relative relationship between the node and a coverage scope of an eNB;

Block 12: A synchronization sequence and in coverage flag of the node may be configured according to the synchronization priority of the node. Combination of the synchronization sequence and in coverage flag of the node may be used to identify the synchronization priority of the node.

The method for identifying the synchronization priority provided by the first embodiment of the present disclosure may be applied to the VICS in general. The synchronization sequence and the in coverage flag set in block 12 may be transmitted via the synchronization information of the Internet of vehicle communication to support the synchronization communication in the Internet of the vehicle communication. The in coverage flag of the node may be called "in coverage flag".

In the first embodiment provided by the present disclosure, due to the introduction of the GNSS, multiple synchronization sources may be configured in the communication system to provide the synchronization information. Specifically, a node that may directly obtain the GNSS information may be configured as the synchronization source. In the alternative, the eNB may be configured as the synchronization source. Since multiple synchronization sources provide the synchronization information, the synchronization convergence may be expedited, the number of synchronization clusters may be reduced and the synchronization efficiency may be improved.

Second Embodiment

Figure 3:
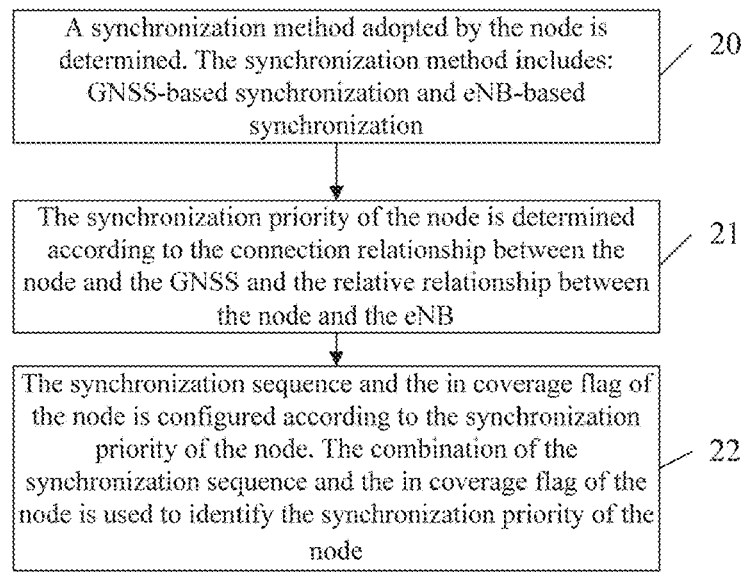
FIG. 3 is a flow chart illustrating basic steps of a method for identifying the synchronization priority in accordance with a second embodiment of the present disclosure.

As shown in FIG. 3, a second embodiment of the present disclosure provides a method for identifying a synchronization priority, including:

Block 20: A synchronization method adopted by the node may be determined. The synchronization method may include: GNSS-based synchronization and eNB-based synchronization.

Specifically, since the communication system in embodiments of the present disclosure may provide multiple kinds of synchronization sources, the synchronization method of the node may need to be determined before determining the synchronization priority of the node. The synchronization priority of the node may be determined according to the synchronization method, the connection relationship between the node and the GNSS and the relative relationship between the node and the coverage scope of the eNB.

In embodiments of the present disclosure, the synchronization priority of the node may be divided into the first priority, the second priority, the third priority and the fourth priority. The method for dividing the synchronization priority may be different for the GNSS-based synchronization and eNB-based synchronization. The method for dividing the synchronization priority may be respectively described in detail hereinafter for the GNSS-based synchronization and eNB-based synchronization.

Block 21: The synchronization priority of the node may be determined according to the connection relationship between the node and the GNSS and the relative relationship between the node and the eNB.

Block 22: The synchronization sequence and the in coverage flag of the node may be configured according to the synchronization priority of the node. The combination of the synchronization sequence and the in coverage flag of the node may be used to identify the synchronization priority of the node.

In order to clearly describe the technical scheme of the present disclosure, firstly, the connection relationship between the node and the GNSS may be summarized. There may be three kinds of connection relationships between the node and the GNSS. The first kind of connection relationship may be that the node may directly obtain the information of the GNSS. The second kind of connection relationship may be that the node may not directly obtain the information of the GNSS, however, the node may indirectly obtain the information of the GNSS via another node, i.e., the node may obtain the information of the GNSS via an indirect hop. The third kind of connection relationship may be that the node may not directly obtain the information of the GNSS, however, the node may obtain the information of the GNSS via sequential forwarding of multiple other nodes, i.e. the node may obtain the information of the GNSS via two indirect hops or more than two hops. Secondly, the relative relationship between the node and the coverage scope of the eNB may be summarized. There may be three kinds of relative relationships between the node and the coverage scope of the eNB. The first kind of relative relationship may be that the node is in the coverage of the eNB and the node may be called the in-coverage node. The second kind of relative relationship may be that the node may be out of the coverage of the eNB, however, the node may receive synchronization information from an in-coverage node, the node may synchronize with the in-coverage node and the node may be called a partial-in-coverage node. The third kind of relative relationship may be that the node may be out of the coverage of the eNB, however, the node cannot receive the synchronization information from the in-coverage node and the node may be called an out-of-coverage node.

In an embodiment of the present disclosure, the three kinds of connection relationships may be combined with the three kinds of relative relationships and the synchronization priority of the node may be determined according to the combination thereof.

Further, when the synchronization method is the GNSS-based synchronization, the block 21 may include:

Block 211: When the node is in the coverage of the eNB and the node may directly obtain the information of the GNSS, the synchronization priority of the node may be determined as a first priority.

In this block, two conditions that need to be satisfied by the node of the first priority may be that the node may be the in-coverage node and the node may directly obtain the information of the GNSS.

Block 212: When the node is out of the coverage of the eNB and the node may directly obtain the information of the GNSS, the synchronization priority of the node may be determined as a second priority.

In this block, there may be two kinds of situations that the node is out of the coverage of the eNB, i.e., the node may be the out-of-coverage node and the node may be the partial-in-coverage node. Two conditions that need to be satisfied by the node of the second priority may be that the node may be the out-of-coverage node and the node may directly obtain the information of the GNSS. In the alternative, two conditions that should be satisfied by the node of the second priority should be that the node may be the partial-in-coverage node and may directly obtain the information of the GNSS.

Block 213: When the node cannot directly obtain the information of the GNSS, but the node may indirectly obtain the information of the GNSS via another node, the synchronization priority of the node may be determined as a third priority.

In this block, as long as the node cannot directly obtain the information of the GNSS, but may obtain the information of the GNSS via one indirect hop, no matter whether the node is in the coverage of the eNB or out of coverage of the eNB, the synchronization priority of the node should be configured as the third priority. That is, two conditions that should be satisfied by the node of the third priority should be that the node may be the in-coverage node and the node may obtain the information of the GNSS via an indirect hop. In the alternative, two conditions that should be satisfied by the node of the third priority may be that the node may be an out-of-coverage node and the node may obtain the information of the GNSS via one indirect hop. In the alternative, two conditions that should be satisfied by the node of the third priority may be that the node may be the partial-in-coverage node and the node may obtain the information of the GNSS via one indirect hop.

Block 214: Otherwise, the synchronization priority of the node should be determined as the fourth priority. That is, when the node does not satisfy the above conditions of the first priority, does not satisfy the conditions of the second priority, also does not satisfy the conditions of the third priority, the synchronization priority of the node should be determined as a fourth priority.

Specifically, the block 214 for determining the synchronization priority of the node as the fourth priority may include:

Block 2141: when the node cannot directly obtain the information of the GNSS, but the node may indirectly obtain the information of the GNSS via sequential forwarding of multiple other nodes, the synchronization priority of the node may be determined as the fourth priority.

In this block, as long as the node cannot directly obtain the information of the GNSS, but the node may obtain the information of the GNSS via two indirect hops and more than two hops, no matter the node is in the coverage of the eNB or out of the coverage of the eNB, the synchronization priority of the node should be determined as the fourth priority. That is, two conditions that should be satisfied by the node of the fourth priority may be that the node may be the in-coverage node and the node may obtain the information of the GNSS via two indirect hops or more than two hops. In the alternative, two conditions that should be satisfied by the node of the fourth priority may be that the node may be an out-of-coverage node and may obtain the information of the GNSS via two indirect hops and more than two hops. In the alternative, two conditions that should be satisfied by the node of the fourth priority may be that the node may be a partial-in-coverage node and may obtain the information of the GNSS via two indirect hops and more than two hops.

Block 2142: When the node is out of the coverage of the eNB and the node adopts an independent synchronization source, the synchronization priority of the node may be determined as the fourth priority.

In this block, the node may be an out-of-coverage node and the out-of-coverage node does not select any synchronization reference node, forms an independent synchronization source, therefore the synchronization priority of the node may be the fourth priority.

Further, when the synchronization method may be the eNB-based synchronization, the block 21 may include:

Block 215: when the node is in the coverage of the eNB and the node synchronizes with the eNB, the synchronization priority of the node may be determined as the first priority.

In this block, two conditions that should be satisfied by the node of the first priority may be that the node may be an in-coverage node and the node may synchronize with the eNB.

Block 216: when the node is out of the coverage of the eNB and the eNB may directly obtain the information of the GNSS, the synchronization priority of the node may be determined as the second priority.

In this block, a situation that the node may be out of coverage of the eNB may refer to that the node may be an out-of-coverage node. Two conditions that should be satisfied by the node of the second priority may be that the node may be an out-of-coverage node and the node may directly obtain the information of the GNSS.

Block 217: when the node is out of the coverage of the eNB and the node cannot directly obtain the information of the GNSS, but may indirectly obtain the information of the GNSS via another node, the synchronization priority of the node may be determined as the third priority.

In this block, a situation that the node may be out of the coverage of the eNB may refer to that the node may be an out-of-coverage node. Two conditions that should be satisfied by the node of the third priority may be that the node may be an out-of-coverage node and the node may obtain the information of the GNSS via one indirect hop.

Block 218: Otherwise, the synchronization priority of the node should be determined as the fourth priority. That is, when the node does not satisfy the above conditions of the first priority, does not satisfy the conditions of the second priority, also does not satisfy the conditions of the third priority, the synchronization priority of the node should be determined as the fourth priority.

Specifically, the block 218 for determining the synchronization priority of the node as the fourth priority may include:

Block 2181: when the node is out of the coverage of the eNB, and the node cannot directly obtain the information of the GNSS, but the node may obtain the information of the GNSS via sequential forwarding of multiple other nodes, the synchronization priority of the node may be determined as the fourth priority.

In this block, a node which may be out of the coverage of the eNB may be an out-of-coverage node. That is, two conditions that should be satisfied by the node of the fourth priority may be that the node may be an out-of-coverage node and may obtain the information of the GNSS via two indirect hops and more than two hops.

Block 2182: when the node is out of the coverage of the eNB and the node is able to receive synchronization information sent from a node that is in the coverage of the eNB, the synchronization priority of the node may be determined as the fourth priority.

In this block, the node, which may be out of the coverage of the eNB and may receive the synchronization information sent from a node that may be in the coverage of the eNB, may be the partial-in-coverage node. That is, as for the eNB-based synchronization, as long as the node is the partial-in-coverage node, no matter whether the node may directly obtain the information of the GNSS or indirectly obtain the information of the GNSS, the synchronization priority of the node should be the fourth priority.

Block 2182: When the node is out of the coverage of the eNB and the node uses an independent synchronization source, the synchronization priority of the node may be determined as the fourth priority.

In this block, the node may be an out-of-coverage node and the out-of-coverage node may not select any synchronization reference node, may form an independent synchronization source, therefore the synchronization priority of the node may be the fourth priority.

Specifically, the block 22 in the second embodiment of the present disclosure may include:

Block 221, when the synchronization priority of the node is the first priority and the synchronization method of the node is GNSS-based synchronization, the synchronization sequence of the node may be determined as a first synchronization sequence and an identifier of the first synchronization sequence may be a first fixed value and the in coverage flag of the node may be determined as a first flag. When the synchronization method of the node is an eNB-based synchronization, the synchronization sequence of the node may be determined as the first synchronization sequence and the identifier of the first synchronization sequence may be a third fixed value and the in coverage flag of the node may be determined as the first flag.

It should be noted that in this embodiment of the present disclosure, the first synchronization sequence may be an id_net sequence, and the second synchronization sequence may be an id_oon sequence. The identifier of the first synchronization sequence may be in a range of [0,167] and the identifier of the second synchronization sequence may be in a range of [168, 335]. The flag of the coverage scope may be an in coverage flag. The first flag may be True and the second flag may be False.

In this block, the synchronization sequence and in coverage flag may be configured for the node of the first priority, and may specifically include:

The GNSS-based synchronization: the synchronization sequence may be selected from the id_net sequence, the id may be configured as a first fixed value X1 and the in coverage flag may be configured as True.

The eNB-based synchronization: the synchronization sequence may be selected from the id_net sequence and the id may be configured as the third fixed value X3. The third fixed value X3 may be a value in the id_net sequence excluding X1 and X2. It should be noted that the synchronization sequence in this block may be configured by the eNB via the system information and the in coverage flag may be configured as True.

Block 222: when the synchronization priority of the node is the second priority, the synchronization sequence of the node may be determined as the first synchronization sequence, the identifier of the first synchronization sequence may be determined as the first fixed value and the in coverage flag of the node may be determined as a second flag.

Specifically, as for the GNSS-based synchronization and eNB-based synchronization, the node of the second priority may be configured as that the synchronization sequence may be selected from the id_net sequence, the id may be configured as the first fixed value X1 and in coverage flag may be configured as False.

Block 223: when the synchronization priority of the node is the third priority, the synchronization sequence of the node may be determined as the first synchronization sequence, the identifier of the first synchronization sequence may be determined as the second fixed value and the in coverage flag of the node may be determined as the second flag.

Specifically, as for the GNSS-based synchronization and eNB-based synchronization, the node of the third priority may be configured as that the synchronization sequence may be selected from the id_net sequence, the id may be configured as the second fixed value X2 and the in coverage flag may be configured as False.

Block 224: when the synchronization sequence of the node is the fourth priority, a synchronization reference node selected by the node may be the node of the third priority, the synchronization sequence of the node may be determined as a second synchronization sequence, an identifier of the second synchronization sequence may be the sum of the second fixed value and a preset value (the preset value may be 168), the in coverage flag of the node may be determined as the second flag. When the synchronization reference node selected by the node is the node of the fourth priority, the synchronization sequence of the node may be determined as the second synchronization sequence, the identifier of the second synchronization sequence may be the same as the identifier of the second synchronization sequence of the synchronization reference node and the in coverage flag of the node may be determined as the second flag. When the node uses the independent synchronization source, the synchronization sequence of the node may be determined as the second synchronization sequence, an identifier of the second synchronization sequence may be determined as an arbitrary value of the second synchronization sequence and the in coverage flag of the node may be determined as the second flag.

Specifically, as for the node of the fourth priority, no matter whether the synchronization is the GNSS-based synchronization or the eNB-based synchronization, all of the following three situations may be included:

a) The synchronization reference node selected by the node may be that of the third priority: The synchronization sequence may be selected from the id_oon sequence, the value of the id may equal to the second fixed value X2+168 and the in coverage flag may be configured as False;

b) The synchronization reference node selected by the node may be that of the fourth priority: The synchronization sequence may be selected from the id_oon sequence, the value of the id may be the same as the sequence of the synchronization reference node and the in coverage flag may be configured as False;

c) The independent synchronization source: A uniform distribution may be adopted, a value may be randomly selected from the sequence scope of the id_oon [168, 335] and configured as the synchronization sequence of the independent synchronization source and the in coverage flag may be configured as False.

Further, the block 22 may further include:

Block 225: when the synchronization sequence of the node is the fourth priority, the node adopts the eNB-based synchronization and the node is out of the coverage of the eNB, and the node is able to receive the synchronization information from a node that is in the coverage of the eNB and the synchronization node selected by the node is that of the first priority, the synchronization sequence of the node may be determined as the second synchronization sequence, the identifier of the second synchronization sequence may be the sum of the identifier of the first synchronization sequence of the synchronization node and a preset value and the in coverage flag of the node may be determined as the second flag.

Further, as for the eNB-based synchronization, when the node is the fourth priority, the method may further include the following situation:

d) when the synchronization is the eNB-based synchronization, the synchronization reference node of the partial-in-coverage node may be the node of the first priority, the synchronization sequence of the partial-in-coverage node may be the id value of the synchronization sequence of the reference node (the node of the first priority)+168 and the in coverage flag may be configured as False.

Figure 4:
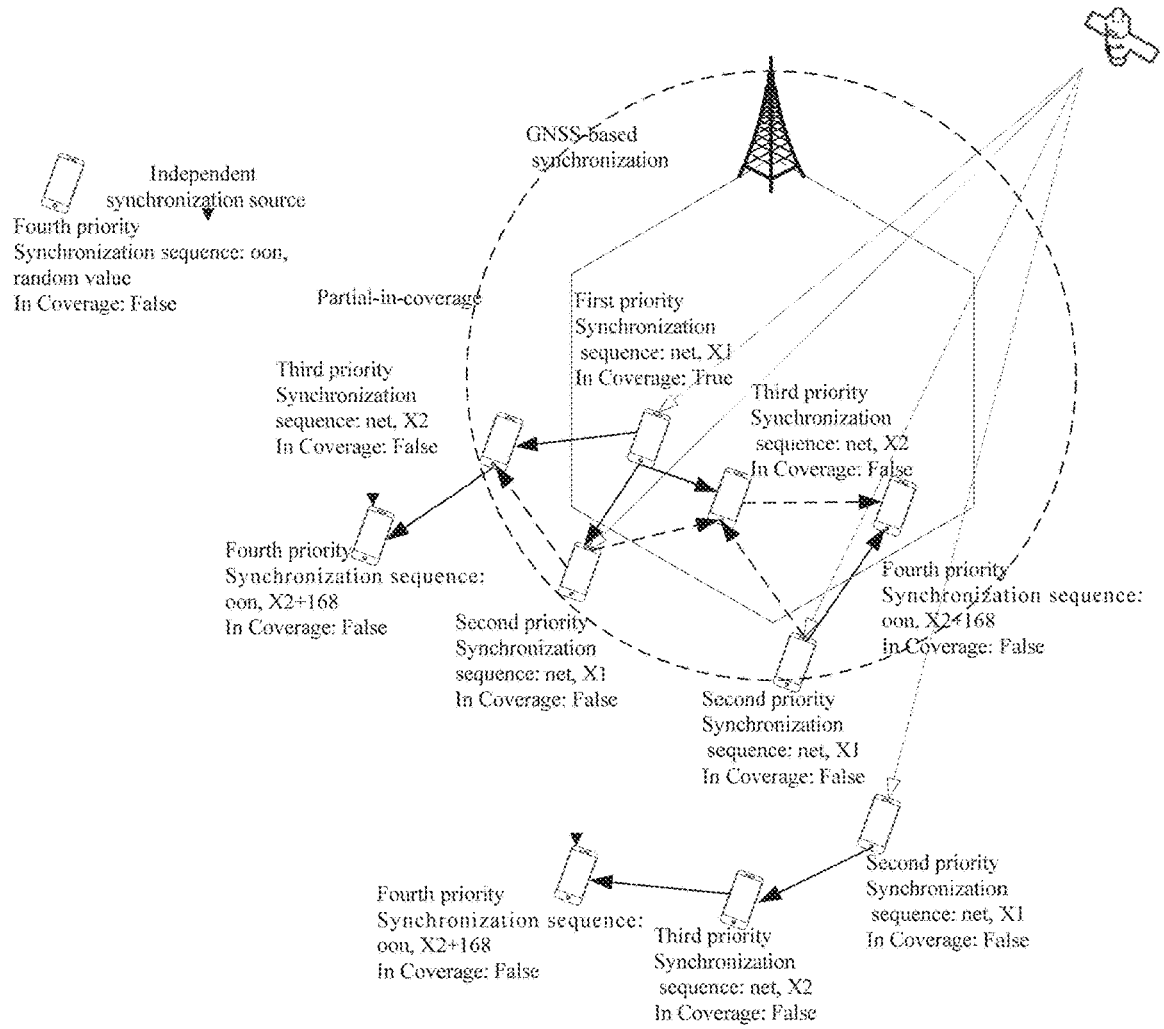
FIG. 4 is a schematic diagram illustrating synchronization priorities and sequences thereof in accordance with the first embodiment of the present disclosure.

For instance:

The first instance: The method for identifying the synchronization priority based on the GNSS synchronization As shown in FIG. 4, the method for configuring the synchronization sequence (SLSS id) and the in coverage flag based on the GNSS synchronization may be as follows:

The node of the first priority: The synchronization sequence may be selected from the id_net sequence, the SLSS id may be configured as the fixed value X1 and the in coverage flag may be configured as True.

The node of the second priority: The synchronization sequence may be selected from the id_net sequence, the SLSS id may be configured as the fixed value X1 and the in coverage flag may be configured as False.

The node of the third priority: The synchronization sequence may be selected from the id_net sequence, the SLSS id may be configured as the fixed value X2 and the in coverage flag may be configured as False.

The node of the fourth priority: The processing situations may be as follows:

The synchronization reference node selected by the node may be that of the third priority: The synchronization sequence may be selected from the id_oon sequence, the value of the SLSS id may be X2+168, and the in coverage flag may be configured as False;

The synchronization reference node selected by the node may be that of the fourth priority: The synchronization sequence may be selected from the id_oon sequence, the value of the SLSS id may be the same as the sequence of the synchronization reference node, and the in coverage flag may be configured as False:

The node may be the independent synchronization source: A uniform distribution may be adopted, a value may be randomly selected from the sequence scope of the id_oon [168, 335] and configured as the synchronization sequence of the independent synchronization source and the in coverage flag may be configured as False.

The second instance: the method for identifying the synchronization priority based on the eNB synchronization.

Figure 5:
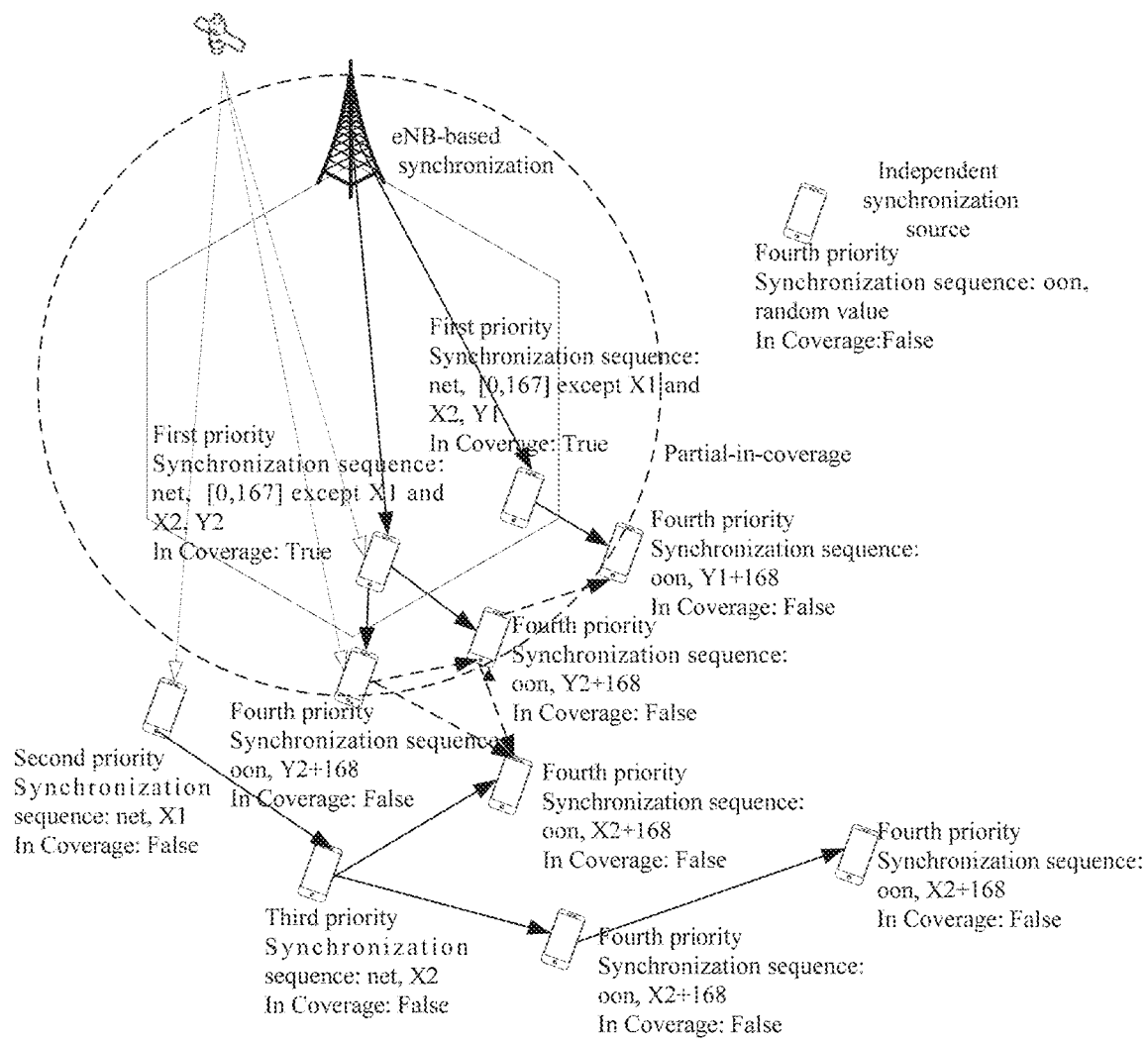
FIG. 5 is a schematic diagram illustrating synchronization priorities and sequences thereof in accordance with the second embodiment of the present disclosure.

As shown in FIG. 5, the method for configuring the synchronization sequence SLSS id and the in coverage flag based on the eNB synchronization may be as follows:

The node of the first priority: the synchronization sequence may be selected from the id_net sequence excluding X1 and X2. The design of reusing the R12 D2D may be configured by the eNB via the system information and may be configured as Y1 or Y2, and the in coverage may be configured as True.

The node of the second priority: the synchronization sequence may be selected to from the id_net sequence, the SLSS id may be configured as the fixed value X1 and the in coverage flag may be configured as False.

The node of the third priority: the synchronization sequence may be selected from the id_net sequence, the value of the SLSS id may be configured as the fixed value X2, and the in coverage flag may be configured as False.

The node of the fourth priority: the processing situations may be as follows:

The synchronization reference node selected by the node may be that of the third priority: The synchronization sequence may be selected from the id_oon sequence, the value of the SLSS id may be X2+168, and the in coverage flag may be configured as False:

The synchronization reference node selected by the node may be that of the fourth priority: The synchronization sequence may be selected from the id_oon sequence, the value of the SLSS id may be the same as the sequence of the synchronization reference node, and the in coverage flag may be configured as False;

The node may be the independent synchronization source: a uniform distribution may be adopted, a value may be randomly selected from the sequence scope of the id_oon [168, 335] and configured as the synchronization sequence of the independent synchronization source and the in coverage flag may be configured as False.

The synchronization reference node of the partial-in-coverage node may be the node of the first priority, the SLSS id of the partial-in-coverage node may be the value of the SLSS id of the synchronization reference node+168, and the in coverage flag may be configured as False.

Figure 6:
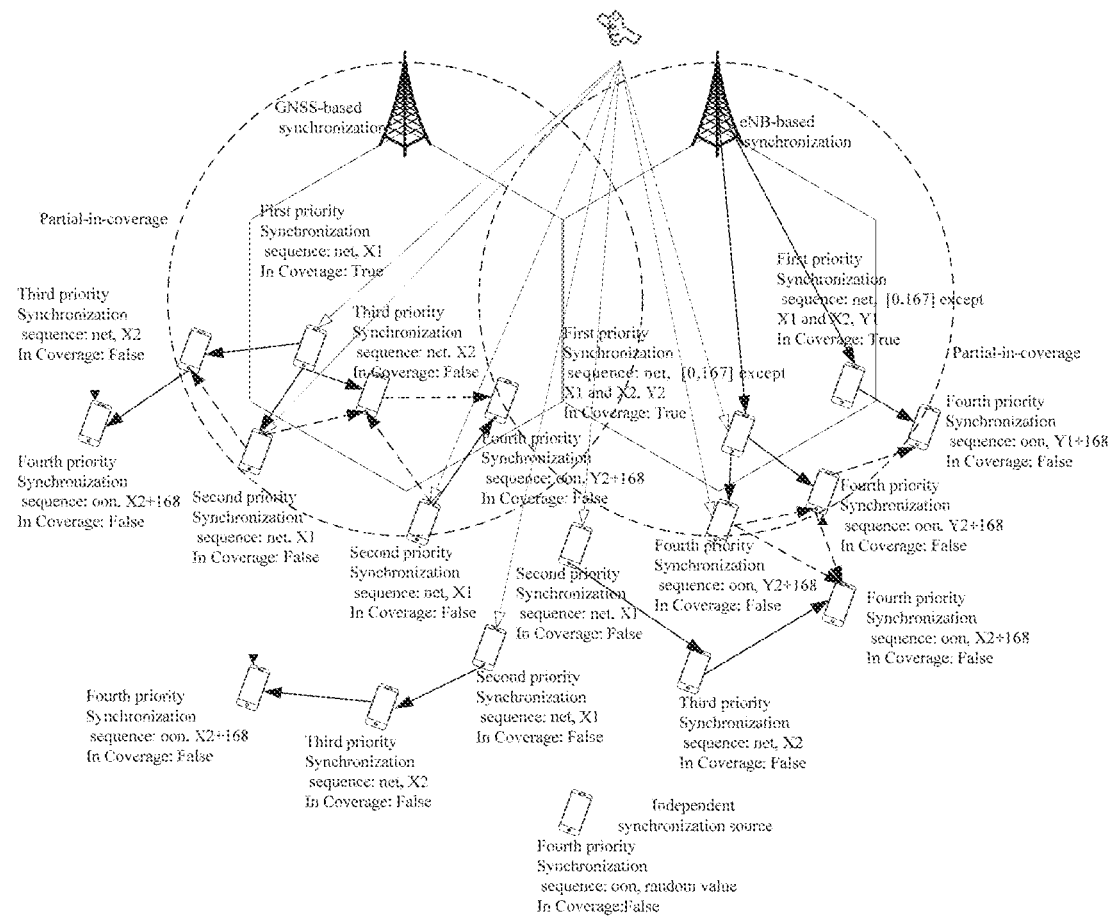
FIG. 6 is a schematic diagram illustrating synchronization priorities and sequences thereof in accordance with the third embodiment of the present disclosure.

The third instance: the system not only includes the GNSS-based synchronization, but also includes the eNB-based synchronization As shown in FIG. 6, the method for configuring the SLSS id and in coverage flag of the system may be as follows:

The node of the first priority:

The GNSS-based synchronization: the synchronization sequence may be selected from the id_net sequence, the SLSS id may be configured as the fixed value X1 and the in coverage flag may be configured as True:

The eNB-based synchronization: the synchronization sequence may be selected from the id_net sequence excluding X1 and X2. The design of reusing the R12 D2D may be configured by the eNB via the system information, may be configured as Y1 or Y2, and the in coverage flag may be configured as True.

The node of the second priority: the synchronization sequence may be selected from the id_net sequence, the SLSS id may be configured as the fixed value X1 and the in coverage flag may be configured as False.

The node of the third priority: the synchronization sequence may be selected from the id_net sequence, the value of the SLSS id may be configured as X2, and the in coverage flag may be configured as False.

The node of the fourth priority: the processing situations may be as follows:

The synchronization reference node selected by the node may be that of the third priority: the synchronization sequence may be selected from the id_oon sequence, the value of the SLSS id may be X2+168, and the in coverage flag may be configured as False;

The synchronization reference node selected by the node may be that of the fourth priority: the synchronization sequence may be selected from the id_oon sequence, the value of the SLSS id may be the same as the sequence of the synchronization reference node, and the in coverage flag may be configured as False;

The node may be the independent synchronization source: a uniform distribution may be adopted, a value may be randomly selected from the sequence scope of the id_oon [168, 335] and configured as the synchronization sequence of the independent synchronization source and the in coverage flag may be configured as False.

As for the eNB-based synchronization, the synchronization reference node of the partial-in-coverage node may be the node of the first priority. The SLSS id of the partial-in-coverage node may be the value of the SLSS id of the synchronization reference node+168 and the in coverage flag may be configured as False.

To sum up, with the methods for identifying the synchronization priority provided by embodiments of the present disclosure, the re-combination of the synchronization sequence and the in coverage flag corresponds to different synchronization priorities, the receiving node may distinguish the synchronization priority via the transmission of the synchronization information. The methods provided by embodiments of the present disclosure make less modification to the existing standard, are convenient for the receiving node to distinguish different synchronization levels, support that the node, which may directly obtain the reliable GNSS, may be configured as the synchronization source, and meanwhile support that the eNB may be configured as the synchronization source; may expedite the synchronization convergence, improve the accuracy of the synchronization, reduce the number of synchronization clusters, and form a uniform timing.

The Third Embodiment

Figure 7:
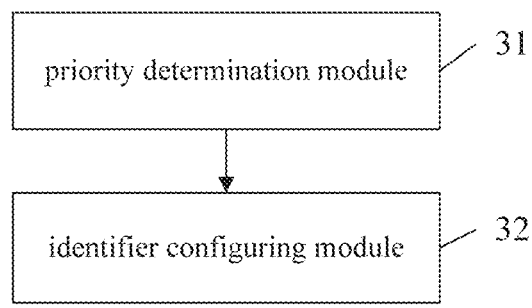
FIG. 7 is a schematic diagram illustrating a device for identifying a synchronization priority in accordance with the third embodiment of the present disclosure.

In order to better implement the above objective, as shown in FIG. 7, the third embodiment of the present disclosure may further provide a device for identifying a synchronization priority, including:

a priority determination module 31, to determine a synchronization priority of a node according a connection relationship between the node and a Global Navigation Satellite System (GNSS) and a relative relationship between the node and a coverage scope of an eNB; and an identifier configuring module 32, to configure a synchronization sequence and an in coverage flag of the node according to the synchronization priority of the node. wherein Combination of the synchronization sequence and the in coverage flag of the node may be used to identify the synchronization priority of the node.

Specifically, in the third embodiment provided by the present disclosure, the device may further include:

a synchronization method determination module, to determine a synchronization method adopted by the node. The synchronization method may include: GNSS-based synchronization and eNB-based synchronization.

Specifically, in the third embodiment of the present disclosure, when the synchronization method is the GNSS-based synchronization, the priority determination module 31 may include:

a first unit, when the node is in the coverage of the eNB and the node is able to directly obtain information of the GNSS, to determine the synchronization priority of the node as a first priority;

a second unit, when the node is out of the coverage of the eNB and the node is able to directly obtain the information of the GNSS, to determine the synchronization priority of the node as a second priority;

a third unit, when the node is not able to directly obtain the information of the GNSS, but the node is able to obtain the information of the GNSS via another node, to determine the synchronization priority of the node as a third priority; and a fourth unit, when the node does not satisfy conditions of the first unit, second unit and third unit, to determine the synchronization priority of the node as a fourth priority.

Specifically, in the third embodiment of the present disclosure, the fourth unit includes:

a first sub-unit, when the node is not able to directly obtain the information of the GNSS, but the node is able to obtain the information of the GNSS via sequential forwarding of multiple other nodes, to determine the synchronization priority of the node as the fourth priority; and a second sub-unit, when the node is out of the coverage of the eNB and the node uses an independent synchronization source, to determine the synchronization priority of the node as the fourth priority.

Specifically, in the third embodiment of the present disclosure, when the synchronization method is the eNB-based synchronization, the priority determination module 31 may include:

a fifth unit, when the node is in the coverage of the eNB and the node synchronizes with the eNB, to determine the synchronization priority of the node as a first priority;

a sixth unit, when the node is out of the coverage of the eNB and the node is able to directly obtain the information of the GNSS, to determine the synchronization priority of the node as a second priority;

a seventh unit, when the node is out of the coverage of the eNB and is not able to directly obtain the information of the GNSS, but the node is able to obtain the information of the GNSS via another node, to determine the synchronization priority of the node as a third priority; and an eighth unit, when the node does not satisfy conditions of the fifth unit, sixth unit and seventh unit, to determine the synchronization priority of the node as a fourth priority.

Specifically, in the third embodiment of the present disclosure, the eighth unit may include:

a third sub-unit, when the node is out of the coverage of the eNB and is not able to directly obtain the information of the GNSS, but the node is able to indirectly obtain the information of the GNSS via sequential forwarding of multiple other nodes, to determine the synchronization priority of the node as the fourth priority;

a fourth sub-unit, when the node is out of the coverage of the eNB and the node is able to receive synchronization information sent from a node that is in the coverage of the eNB, to determine the synchronization priority of the node as the fourth priority; and a fifth sub-unit, when the node is out of the coverage of the eNB and the node uses an independent synchronization source, to determine the synchronization priority of the node as the fourth priority.

Specifically, in the third embodiment of the present disclosure, the identifier configuring module 32 may include:

a first configuring unit, when the synchronization priority of the node is the first priority and the synchronization method of the node is the GNSS-based synchronization, to determine the synchronization sequence of the node as a first synchronization sequence and an identifier of the first synchronization sequence as a first fixed value and to determine the in coverage flag of the node as a first flag; when the synchronization method of the node is an eNB-based synchronization, to determine the synchronization sequence of the node as the first synchronization sequence and the identifier of the first synchronization sequence is a third fixed value and to determine the in coverage flag of the node as the first flag:

a second configuring unit, when the synchronization priority of the node is the second priority, to determine the synchronization sequence of the node as the first synchronization sequence, to determine the identifier of the first synchronization sequence as the first fixed value and to determine the in coverage flag of the node as a second flag;

a third configuring unit, when the synchronization priority of the node is the third priority, to determine the synchronization sequence of the node as the first synchronization sequence, to determine the identifier of the first synchronization sequence as a second fixed value and to determine the in coverage flag of the node as a second flag;

a fourth configuring unit, when the synchronization sequence of the node is the fourth priority, a synchronization reference node selected by the node is the node of the third priority, to determine the synchronization sequence of the node as a second synchronization sequence, to determine that an identifier of the second synchronization sequence is sum of the second fixed value and a preset value, to determine the in coverage flag of the node as the second flag; when the synchronization reference node selected by the node is that of the fourth priority, to determine the synchronization sequence of the node as the second synchronization sequence, to determine that the identifier of the second synchronization sequence may be the same as the identifier of the second synchronization sequence of the synchronization reference node, and to determine the in coverage flag of the node as the second flag; when the node uses the independent synchronization source, to determine the synchronization sequence of the node as the second synchronization sequence, to determine an identifier of the second synchronization sequence as an arbitrary value of the second synchronization sequence and to determine the in coverage flag of the node as the second flag.

Specifically, in the third embodiment of the present disclosure, the identifier configuring module 32 further includes:

a fifth configuring unit, when the synchronization sequence of the node is the fourth priority, the node uses the eNB-based synchronization and the node is partially covered by the eNB, and the synchronization node selected by the node is that of the first priority, to determine the synchronization sequence of the node as the second synchronization sequence, to determine the identifier of the second synchronization sequence as the sum of the identifier of the first synchronization sequence of the synchronization node and a preset value and to determine the in coverage flag of the node as the second flag.

It should be noted that the device for identifying the synchronization priority provided by the third embodiment of the present disclosure may be that using the methods for identifying the synchronization priority provided by the first embodiment and second embodiment. Therefore, all implementation methods provided by the first embodiment and second embodiment may be applied to the third embodiment and may achieve the same or similar advancements.

The Fourth Embodiment

Figure 8:
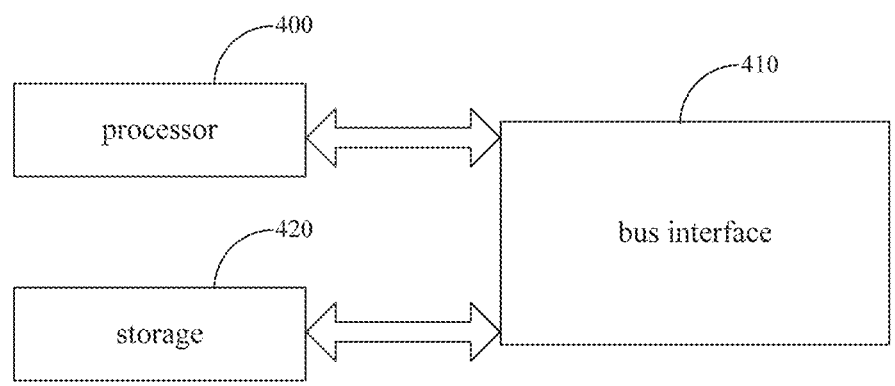
FIG. 8 is a schematic diagram illustrating a device for identifying a synchronization priority in accordance with the fourth embodiment of the present disclosure.

In order to better achieve the above objective, as shown in FIG. 8, the fourth embodiment of the present disclosure may further provide a device for identifying a synchronization priority, including: a processor 400 and a storage 420, which may connect to the processor 400 via a bus interface 410. The storage 420 may store programs and data used by the processor in a process of executing operations. When the processor 400 calls and executes the programs and data stored in the storage 420, following function modules are implemented:

a priority determination module 31, to determine a synchronization priority of a node according a connection relationship between the node and a Global Navigation Satellite System (GNSS) and a relative relationship between the node and a coverage scope of an eNB; and an identifier configuring module 32, to configure a synchronization sequence and an in coverage flag of the node according to the synchronization priority of the node. Combination of the synchronization sequence and the in coverage flag of the node may be used to identify the synchronization priority of the node.

It should be noted that the device for identifying the synchronization priority provided by the fourth embodiment of the present disclosure may correspond to the device for identifying the synchronization priority provided by the third embodiment. Therefore, the transmission device of the UE information provided by the third embodiment may be applied to the fourth embodiment and may achieve the same or similar advancements.

The foregoing only describes examples of the present disclosure. To those skilled in the art, any modifications, equivalent substitutions and improvements made within the spirit and principle of the present disclosure, should be covered by the protection scope of the present disclosure.

What is claimed is:

1. A method for identifying a synchronization priority, which is performed by one of a node, a base station or a satellite, the method comprises:

determining a synchronization priority of a node according a connection relationship between the node and a Global Navigation Satellite System (GNSS) and a relative relationship between the node and a coverage scope of an eNB; and configuring a synchronization sequence and an in coverage flag of the node according to the synchronization priority of the node; wherein combination of the synchronization sequence and the in coverage flag of the node is used to identify the synchronization priority of the node;

wherein, before determining the synchronization priority of the node according the connection relationship between the node and GNSS and the relative relationship between the node and the coverage scope of the eNB, the method further comprises:

determining a synchronization method adopted by the node, wherein the synchronization method includes: GNSS-based synchronization and eNB-based synchronization;

wherein, when the synchronization method is the GNSS-based synchronization, determining the synchronization priority of the node according the connection relationship between the node and the GNSS and the relative relationship between the node and the coverage scope of the eNB comprises:

when the node is in the coverage of the eNB and the node is able to directly obtain information of the GNSS, determining the synchronization priority of the node as a first priority;

when the node is out of the coverage of the eNB and the node is able to directly obtain the information of the GNSS, determining the synchronization priority of the node as a second priority;

when the node is not able to directly obtain the information of the GNSS, but the node is able to obtain the information of the GNSS via another node, determining the synchronization priority of the node as a third priority;

otherwise, determining the synchronization priority of the node as a fourth priority.

2. The method according to claim 1, wherein the relative relationship between the node and the coverage scope of the eNB comprises one of: a first relative relationship, a second relative relationship and a third relative relationship;

the first relative relationship includes that the node is in the coverage of the eNB; the second relative relationship includes that the node is out of the coverage of the eNB, but the node is able to receive synchronization information from a node that is in the coverage of the eNB and synchronizes with the node that is in the coverage of the eNB; the third relative relationship includes that the node is out of the coverage of the eNB, but the node is not able to receive the synchronization information from the node that is in the coverage of the eNB.

3. The method according to claim 1, wherein determining the synchronization priority of the node as a fourth priority comprises:

when the node is not able to obtain the information of the GNSS, but the node is able to obtain the information of the GNSS via sequential forwarding of multiple other nodes, determining the synchronization priority of the node as the fourth priority;

when the node is out of the coverage of the eNB and the node uses an independent synchronization source, determining the synchronization priority of the node as the fourth priority.

4. The method according to claim 1, when the synchronization method is the eNB-based synchronization, determining the synchronization priority of the node according the connection relationship between the node and GNSS and the relative relationship between the node and the coverage scope of the eNB comprises:

when the node is in the coverage of the eNB and the node synchronizes with the eNB, determining the synchronization priority of the node as a first priority;

when the node is out of the coverage of the eNB and the node is able to directly obtain the information of the GNSS, determining the synchronization priority of the node as a second priority;

when the node is out of the coverage of the eNB and is not able to directly obtain the information of the GNSS, but the node is able to obtain the information of the GNSS via another node, determining the synchronization priority of the node as a third priority;

otherwise, determining the synchronization priority of the node as a fourth priority.

5. The method according to claim 4, wherein determining the synchronization priority of the node as the fourth priority comprises:

when the node is out of the coverage of the eNB and is not able to directly obtain the information of the GNSS, but the node is able to obtain the information of the GNSS via sequential forwarding of multiple other nodes, determining the synchronization priority of the node as the fourth priority;

when the node is out of the coverage of the eNB and the node is able to receive synchronization information sent from a node that is in the coverage of the eNB, determining the synchronization priority of the node as the fourth priority;

when the node is out of the coverage of the eNB and the node uses an independent synchronization source, determining the synchronization priority of the node as the fourth priority.

6. The method according to claim 5, wherein configuring the synchronization sequence and in coverage flag of the node according to the synchronization priority of the node comprises:

when the synchronization priority of the node is the first priority and the synchronization method of the node is the GNSS-based synchronization, determining the synchronization sequence of the node as a first synchronization sequence and an identifier of the first synchronization sequence is a first fixed value and determining the in coverage flag of the node as a first flag; when the synchronization method of the node is the eNB-based synchronization, determining the synchronization sequence of the node as the first synchronization sequence and the identifier of the first synchronization sequence as a third fixed value and determining the in coverage flag of the node as the first flag;

when the synchronization priority of the node is the second priority, determining the synchronization sequence of the node as the first synchronization sequence, determining the identifier of the first synchronization sequence as the first fixed value and determining the in coverage flag of the node as a second flag;

when the synchronization priority of the node is the third priority, determining the synchronization sequence of the node as the first synchronization sequence, determining the identifier of the first synchronization sequence as the second fixed value and determining the in coverage flag of the node as the second flag;

when the synchronization sequence of the node is the fourth priority and a synchronization reference node selected by the node is the node of the third priority, determining the synchronization sequence of the node as a second synchronization sequence, determining that an identifier of the second synchronization sequence is sum of the second fixed value and a preset value, determining the in coverage flag of the node as the second flag; when the synchronization reference node selected by the node is that of the fourth priority, determining the synchronization sequence of the node as the second synchronization sequence, determining that the identifier of the second synchronization sequence is the same as the identifier of the second synchronization sequence of the synchronization reference node, and determining the in coverage flag of the node as the second flag; when the node uses the independent synchronization source, determining the synchronization sequence of the node as the second synchronization sequence, determining the identifier of the second synchronization sequence as an arbitrary value of the second synchronization sequence and determining the in coverage flag of the node as the second flag.

7. The method according to claim 6, wherein configuring the synchronization sequence and in coverage flag of the node according to the synchronization priority of the node comprises:

when the synchronization sequence of the node is the fourth priority, the node uses the eNB-based synchronization and the node is out of the coverage of the eNB, and the node is able to receive the synchronization information from a node that is in the coverage of the eNB and the synchronization node selected by the node is that of the first priority, determining the synchronization sequence of the node as the second synchronization sequence, determining the identifier of the second synchronization sequence as the sum of the identifier of the first synchronization sequence of the synchronization node and a preset value and determining the in coverage flag of the node as the second flag.

8. A device for identifying a synchronization priority in one of a node, a base station or a satellite, comprising: a processor, a transceiver and a storage; wherein the processor is configured to read a program stored in the storage to:

determine a synchronization priority of a node according a connection relationship between the node and a Global Navigation Satellite System (GNSS) and a relative relationship between the node and a coverage scope of an eNB; and configure a synchronization sequence and an in coverage flag of the node according to the synchronization priority of the node; wherein combination of the synchronization sequence and the in coverage flag of the node is used to identify the synchronization priority of the node;

wherein the processor is further configured to determine a synchronization method adopted by the node, wherein the synchronization method includes: GNSS-based synchronization and eNB-based synchronization;

wherein, when the synchronization method is the GNSS-based synchronization, the processor is further configured to:

determine the synchronization priority of the node as a first priority when the node is in the coverage of the eNB and the node is able to directly obtain information of the GNSS;

determine the synchronization priority of the node as a second priority when the node is out of the coverage of the eNB and the node is able to directly obtain the information of the GNSS, configured to determine the synchronization priority of the node as a second priority;

determine the synchronization priority of the node as a third priority when the node is not able to directly obtain the information of the GNSS, but the node is able to obtain the information of the GNSS via another node; and determine the synchronization priority of the node as a fourth priority when the node does not satisfy the above conditions.

9. The device according to claim 8, wherein the relative relationship between the node and the coverage scope of the eNB comprises one of: a first relative relationship, a second relative relationship and a third relative relationship;

the first relative relationship includes that the node is in the coverage of the eNB; the second relative relationship includes that the node is out of the coverage of the eNB, but the node is able to receive synchronization information from a node that is in the coverage of the eNB and synchronizes with the node that is in the coverage of the eNB; the third relative relationship includes that the node is out of the coverage of the eNB, but the node is not able to receive the synchronization information from the node that is in the coverage of the eNB.

10. The device according to claim 8, wherein the processor is further configured to:
   determine the synchronization priority of the node as the fourth priority when the node is not able to directly obtain the information of the GNSS, but the node is able to obtain the information of the GNSS via sequential forwarding of multiple other nodes; and
   determine the synchronization priority of the node as the fourth priority when the node is out of the coverage of the eNB and the node uses an independent synchronization source.

11. The device according to claim 8, wherein when the synchronization method is the eNB-based synchronization, the processor is further configured to:
   determine the synchronization priority of the node as a first priority when the node is in the coverage of the eNB and the node synchronizes with the eNB;
   determine the synchronization priority of the node as a second priority when the node is out of the coverage of the eNB and the node is able to directly obtain the information of the GNSS;
   determine the synchronization priority of the node as a third priority when the node is out of the coverage of the eNB and is not able to directly obtain the information of the GNSS, but the node is able to obtain the information of the GNSS via another node, configured to determine the synchronization priority of the node as a third priority; and
   determine the synchronization priority of the node as a fourth priority when the node does not satisfy the above conditions.

12. The device according to claim 11, wherein the processor is further configured to:
   determine the synchronization priority of the node as the fourth priority when the node is out of the coverage of the eNB and is not able to directly obtain the information of the GNSS, but the node is able to indirectly obtain the information of the GNSS via sequential forwarding of multiple other nodes;
   determine the synchronization priority of the node as the fourth priority when the node is out of the coverage of the eNB and the node is able to receive synchronization information sent from a node that is in the coverage of the eNB; and
   determine the synchronization priority of the node as the fourth priority when the node is out of the coverage of the eNB and the node uses an independent synchronization source.

13. The device according to claim 12, wherein the processor is further configured to:
   determine the synchronization sequence of the node as a first synchronization sequence and an identifier of the first synchronization sequence as a first fixed value and determine the in coverage flag of the node as a first flag, when the synchronization priority of the node is the first priority and the synchronization method of the node is the GNSS-based synchronization;
   determine the synchronization sequence of the node as the first synchronization sequence and the identifier of the first synchronization sequence is a third fixed value and determine the in coverage flag of the node as the first flag, when the synchronization method of the node is an eNB-based synchronization;
   determine the synchronization sequence of the node as the first synchronization sequence, determine the identifier of the first synchronization sequence as the first fixed value and to determine the in coverage flag of the node as a second flag, when the synchronization priority of the node is the second priority;
   determine the synchronization sequence of the node as the first synchronization sequence, determine the identifier of the first synchronization sequence as a second fixed value and to determine the in coverage flag of the node as a second flag, when the synchronization priority of the node is the third priority;
   determine the synchronization sequence of the node as a second synchronization sequence, determine that an identifier of the second synchronization sequence is sum of the second fixed value and a preset value, determine the in coverage flag of the node as the second flag, when the synchronization sequence of the node is the fourth priority, a synchronization reference node selected by the node is the node of the third priority;
   determine the synchronization sequence of the node as the second synchronization sequence, determine that the identifier of the second synchronization sequence is the same as the identifier of the second synchronization sequence of the synchronization reference node, and determine the in coverage flag of the node as the second flag; when the node uses the independent synchronization source, configured to determine the synchronization sequence of the node as the second synchronization sequence, determine an identifier of the second synchronization sequence as an arbitrary value of the second synchronization sequence and to determine the in coverage flag of the node as the second flag, when the node uses the independent synchronization source.

14. The device according to claim 13, wherein the processor is further configured to:
   determine the synchronization sequence of the node as the second synchronization sequence, determine the identifier of the second synchronization sequence as the sum of the identifier of the first synchronization sequence of the synchronization node and a preset value and determine the in coverage flag of the node as the second flag, when the synchronization sequence of the node is the fourth priority, the node uses the eNB-based synchronization and the node is out of the coverage of the eNB, and the node is able to receive the synchronization information from a node that is in the coverage of the eNB and the synchronization node selected by the node is that of the first priority.

15. A method for identifying a synchronization priority of a vehicle infrastructure cooperative system which is performed by one of a node, a base station or a satellite, the method comprises:
   determining a synchronization priority of a node according a connection relationship between the node and a Global Navigation Satellite System (GNSS) and a relative relationship between the node and a coverage scope of an eNB; and
   configuring a synchronization sequence and an in coverage flag of the node according to the synchronization priority of the node; wherein combination of the synchronization sequence and the in coverage flag of the node is used to identify the synchronization priority of the node;
   wherein, before determining the synchronization priority of the node according the connection relationship between the node and GNSS and the relative relationship between the node and the coverage scope of the eNB, the method further comprises:

determining a synchronization method adopted by the node, wherein the synchronization method includes: GNSS-based synchronization and eNB-based synchronization;

wherein, when the synchronization method is the GNSS-based synchronization, determining the synchronization priority of the node according the connection relationship between the node and the GNSS and the relative relationship between the node and the coverage scope of the eNB comprises:

when the node is in the coverage of the eNB and the node is able to directly obtain information of the GNSS, determining the synchronization priority of the node as a first priority;

when the node is out of the coverage of the eNB and the node is able to directly obtain the information of the GNSS, determining the synchronization priority of the node as a second priority;

when the node is not able to directly obtain the information of the GNSS, but the node is able to obtain the information of the GNSS via another node, determining the synchronization priority of the node as a third priority;

otherwise, determining the synchronization priority of the node as a fourth priority.

* * * * *